United States Patent [19]
Ito et al.

[11] Patent Number: 5,198,843
[45] Date of Patent: Mar. 30, 1993

[54] OPTICAL MARKING SYSTEM HAVING MARKING MODE SELECTING FUNCTION

[75] Inventors: Hiroshi Ito; Shuichi Ishida; Yasutomo Fujimori, all of Yokohama, Japan

[73] Assignee: Kabushiki Kaisha Toshiba, Kawasaki, Japan

[21] Appl. No.: 611,469

[22] Filed: Nov. 9, 1990

Related U.S. Application Data

[63] Continuation of Ser. No. 373,172, Jun. 29, 1989, abandoned.

[30] Foreign Application Priority Data

Jun. 30, 1988 [JP] Japan .................. 63-163973
Mar. 27, 1989 [JP] Japan .................. 1-71940

[51] Int. Cl.$^5$ .............................................. H04N 1/21
[52] U.S. Cl. ............................ 346/1.1; 355/20; 346/108
[58] Field of Search ............. 346/107 R, 108, 160, 346/1.1; 355/200, 202, 68, 53

[56] References Cited

U.S. PATENT DOCUMENTS

| | | | |
|---|---|---|---|
| 4,314,261 | 2/1982 | Martinage | 346/108 |
| 4,379,631 | 4/1983 | Kitamura | 355/202 |
| 4,901,109 | 2/1990 | Mitome et al. | 355/68 |

FOREIGN PATENT DOCUMENTS

| | | |
|---|---|---|
| 0110231 | 6/1984 | European Pat. Off. |
| 3208626 | 9/1983 | Fed. Rep. of Germany |
| 3314963 | 10/1983 | Fed. Rep. of Germany |

OTHER PUBLICATIONS

M. J. Weiner, Technical Paper, "Product Marking with Nd; Yag and $CO_2$ Laser", 1976, pp. 1–11, MR76-853.
John A. Nilson, Technical Paper, "Image Micro-Machining with Tea $CO_2$ Lasers", 1975, pp. 1-pp. 10, MR75-584.

Primary Examiner—Mark J. Reinhart
Attorney, Agent, or Firm—Oblon, Spivak, McClelland, Maier & Neustadt

[57] ABSTRACT

An optical marking system is disclosed, in which a light beam of a preset wavelength is generated by a light source. An optical system receives the light beam generated by the light source and directs the received light beam in a present direction. A pattern generator includes a pattern forming section and a non-pattern forming section. Further, a control section controls the optical system to effect a first mode, in which the light beam is directed to the pattern forming section of the pattern generator, to form a predetermined pattern and a second mode, in which the light beam is directed to the non-pattern forming section of the pattern generator. The first and second modes are effected in a preset sequence.

18 Claims, 9 Drawing Sheets

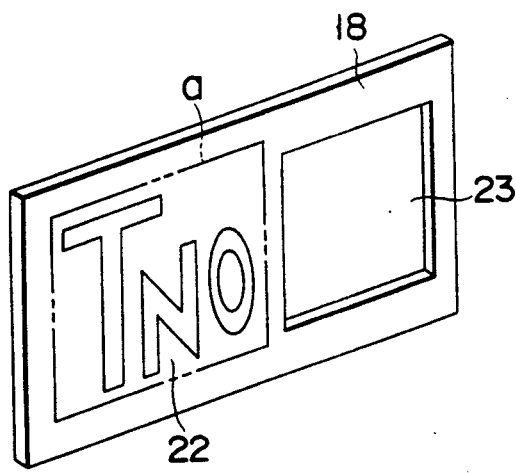
F I G. 2
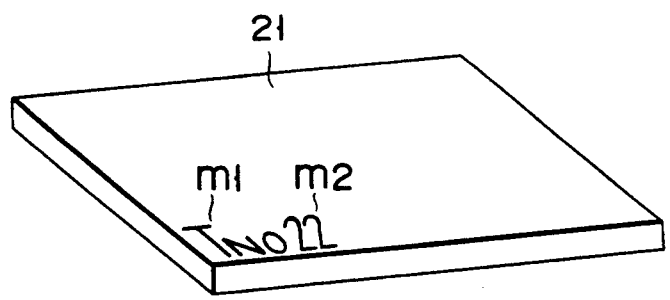
F I G. 3
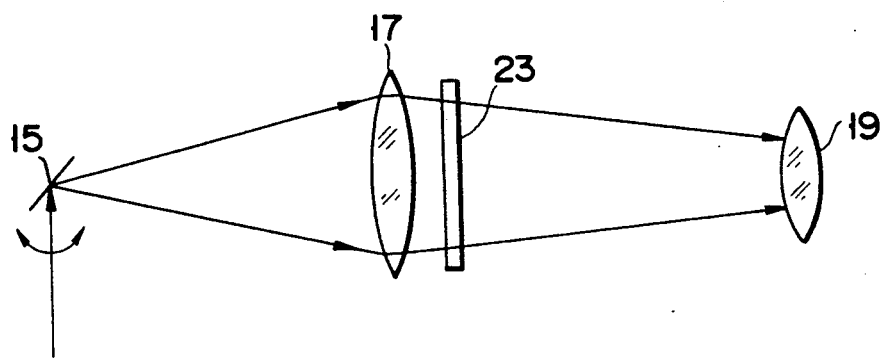
F I G. 4

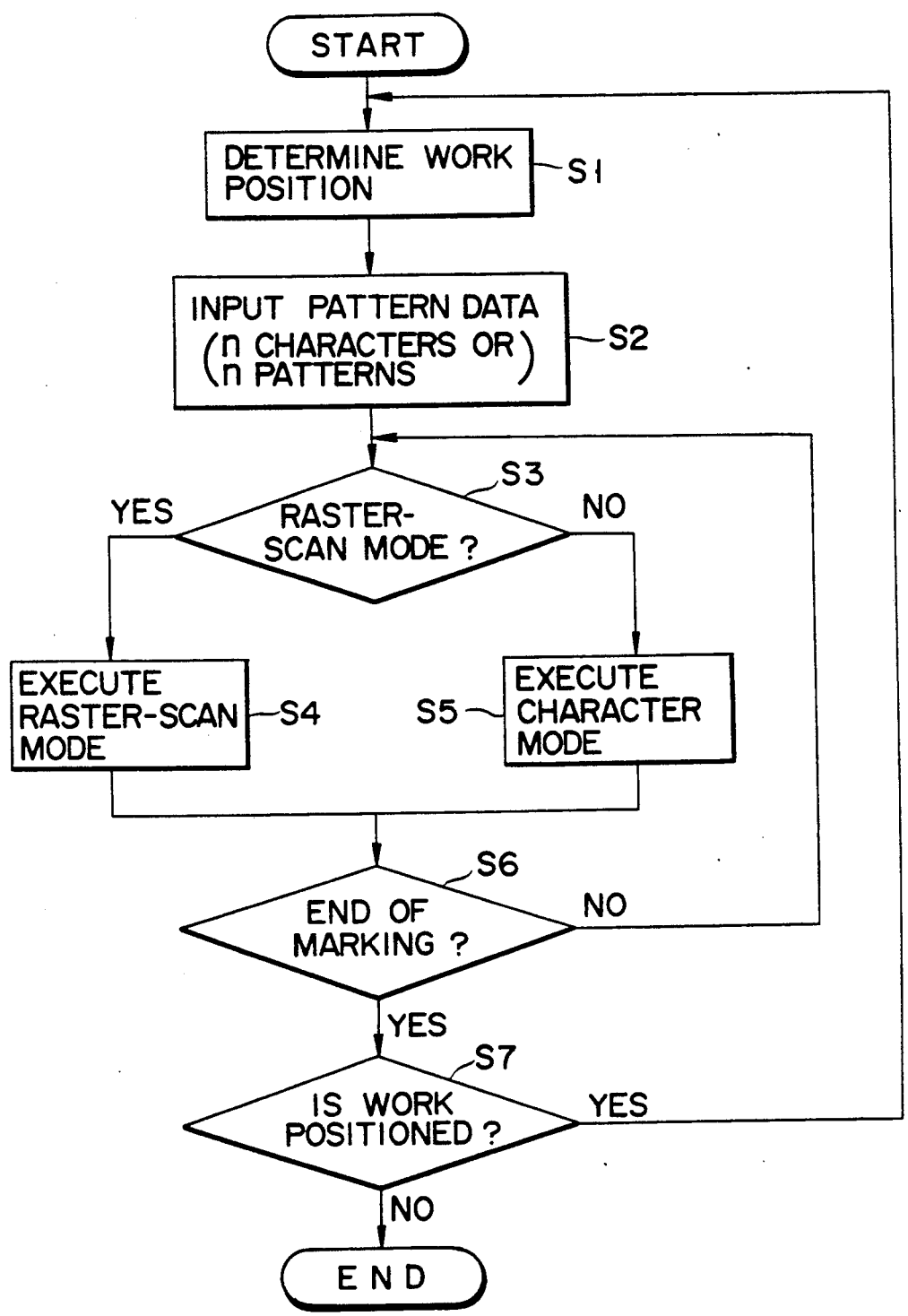
F I G. 6

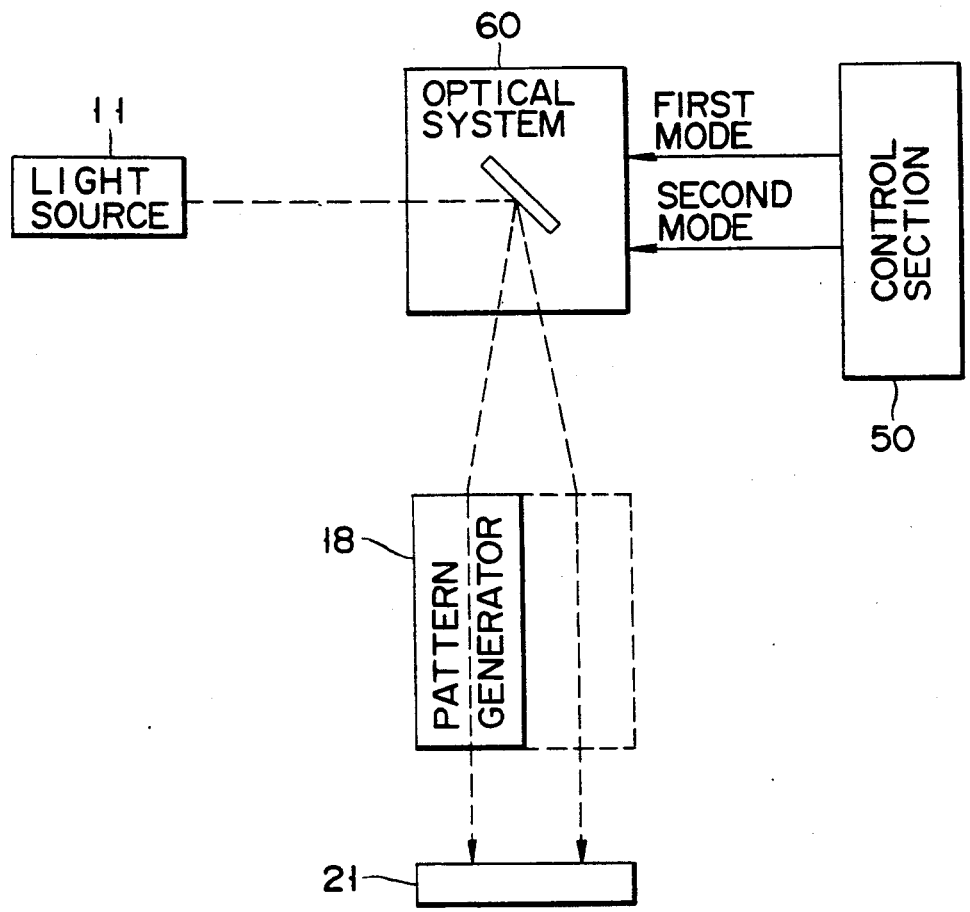
F I G. 7

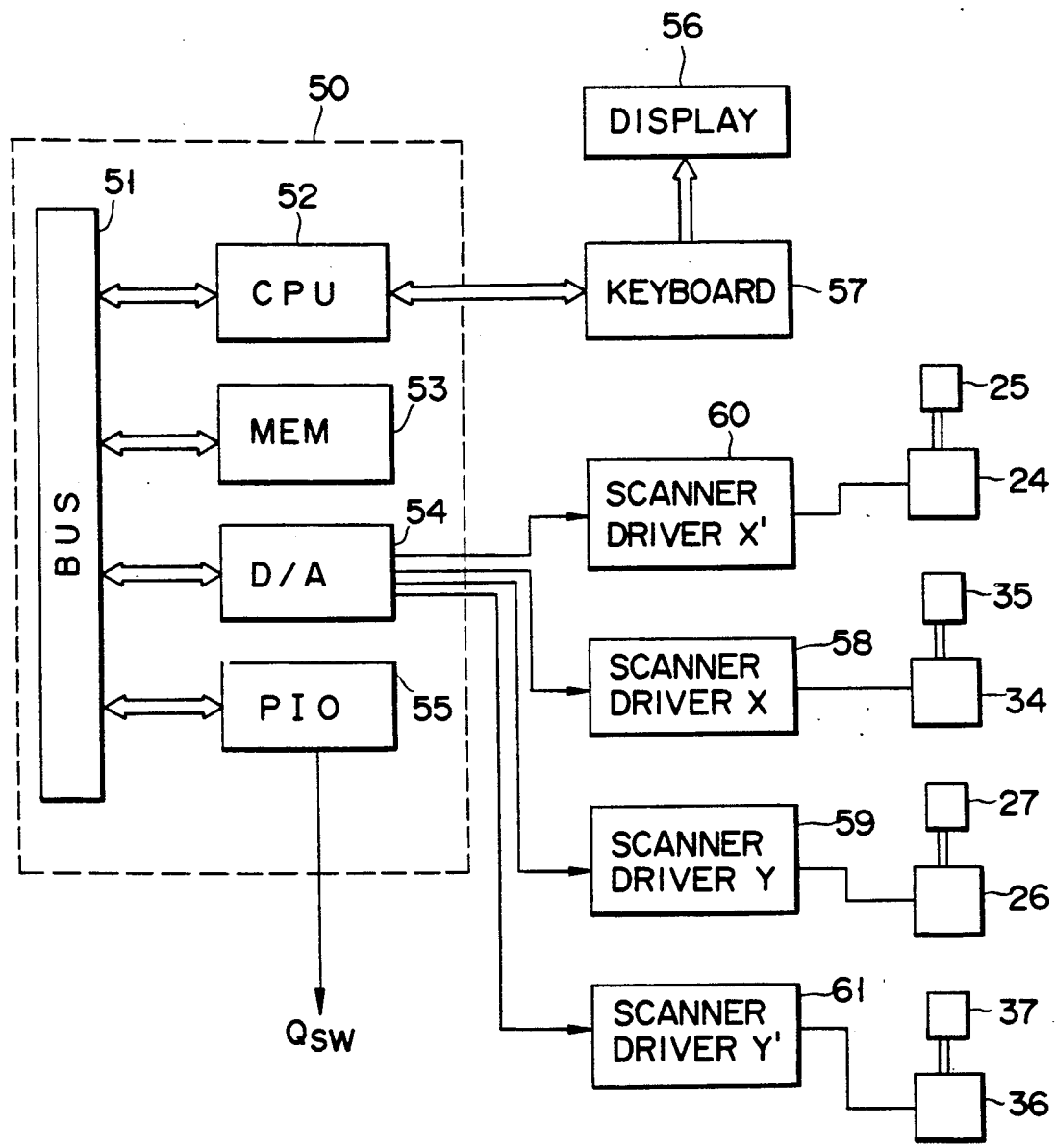
F I G. 11

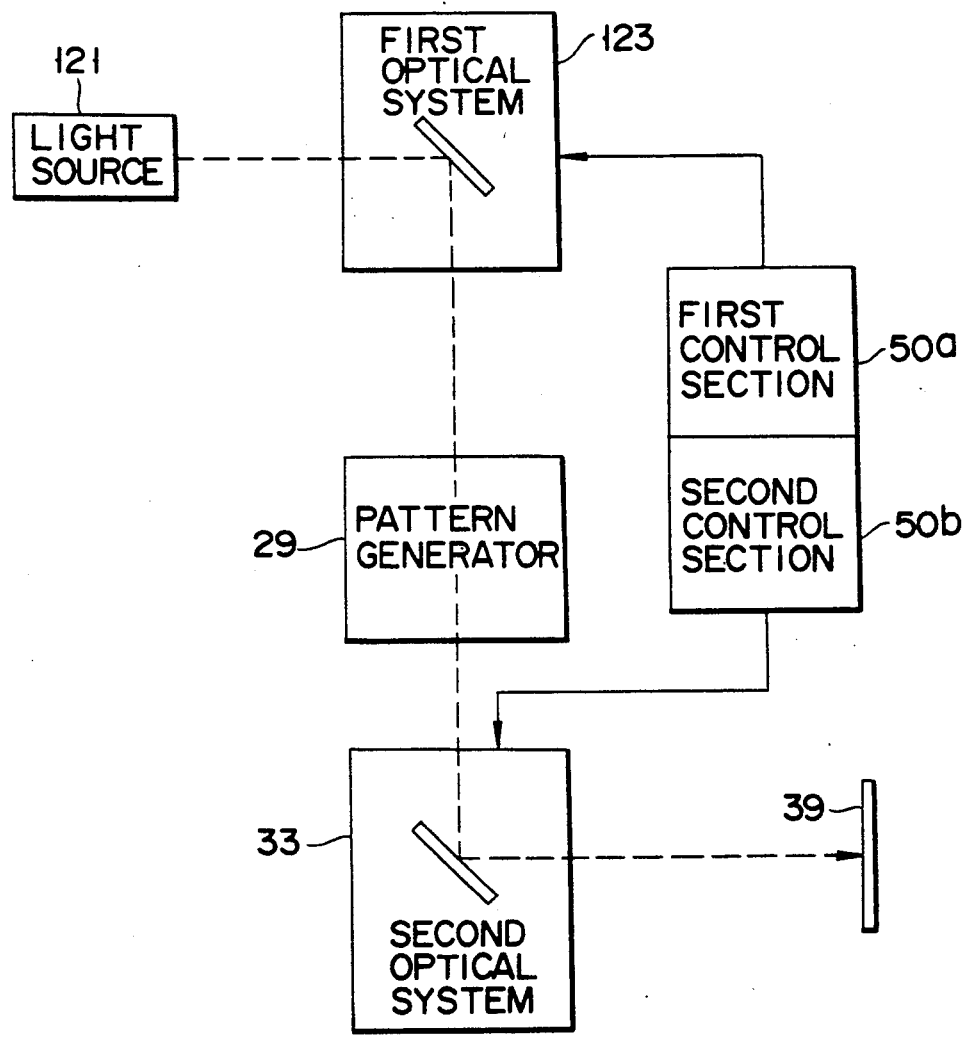
F I G. 12

OPTICAL MARKING SYSTEM HAVING MARKING MODE SELECTING FUNCTION

This application is a continuation of application Ser. No. 07/373,172, filed on Jun. 29, 1989, now abandoned.

BACKGROUND OF THE INVENTION

1. Field of the Invention

This invention relates to a marking apparatus and a marking method; more particularly, to an optical marking apparatus and a method for applying a light beam to an object, to form a mark thereon.

2. Description of the Related Art

Laser marking is essentially a technique of marking on a given product the name of the manufacturer and a serial number, by means of a laser beam, so as to render the product readily identifiable.

There are two main methods of forming marks by laser marking. One method, used in the case of relatively complicated patterns, such as a company emblem or Chinese characters, is to raster-scan the mask of a pattern to be formed on an object or work by means of a laser beam, and then to project a light beam having a cross section corresponding to the pattern onto the object surface. The other method, used in the case of simple designs, such as serial numbers, is to scan a laser beam in a single stroke, without using a mask, and thus directly mark the object.

In the case of the marking technique using a mask, a desired pattern can be formed in advance on a mask by, for example, etching and thus a relatively complicated pattern can be marked easily and precisely. However, in the case where simple designs ar intended to be marked, this method has a problem in that it requires changing masks every time a new pattern is intended to be marked. This renders the operation of the system undesirably complicated.

In the case of the technique of applying a laser beam directly to the object, a pattern can be marked by the laser beam being moved by CPU control in accordance with the pattern to be formed. However, the more complicated the pattern to be formed, the more complicated the movement of the light beam is likely to be, thus necessitating ever more complex programming for controlling the movement of the light beam.

Moreover, employing the direct beam application method has a limitation in that the shape of a pattern marked is defined by the spot shape of the laser beam as well as the spot diameter. In other words, if a laser beam having a large spot is used, the edge portion of the pattern marked may be rounded rather than sharply defined.

SUMMARY OF THE INVENTION

An object of this invention is to provide an optical marking apparatus capable of precisely marking on an object a combination of a complicated pattern and a simple pattern by means of selective setting of the marking mode.

Another object of this invention is to provide a marking method for precise marking of a combination of a complicated pattern and a simple pattern by means of selective setting of the marking mode.

Yet another object of this invention is to provide an optical marking apparatus capable of producing sharply defined marking patterns with high efficiency.

A further object of this invention is to provide an optical marking method for producing sharply defined marking patterns with high efficiency.

According to one aspect of this invention, there is provided an optical marking apparatus comprising a light source for generating a light beam of a predetermined wavelength, optical means for receiving the light beam generated by the light source and directing the received light beam in a present direction, forming means positioned in connection with the optical means, and including a pattern forming section and a non-pattern forming section, and control means connected to the optical means, for controlling the optical means to effect a first mode, in which the light beam is directed to the pattern forming section of the forming means, to form a predetermined pattern, and a second mode, in which the light beam is directed to the non-pattern forming section of the forming means, the first and second modes being effected in a present sequence.

According to the other aspect of this invention, there is provided an optical marking method comprising the steps of generating a light beam of a preset wavelength, controlling an optical system to generate a preset pattern by directing the light beam to a pattern generator, in a first mode, and controlling the optical system in a second mode to directly apply the light beam to an object.

BRIEF DESCRIPTION OF THE DRAWINGS

The foregoing aspects and other features of the invention will be explained in the following description in connection with the accompanying drawings, wherein:

FIG. 2 is a perspective view of a mask used in an optical marking system according to this invention;

FIG. 3 is a perspective view of an object which has been subjected to the marking process;

FIG. 4 is a diagram showing the dimensional relation between the mask and lenses;

FIG. 6 is a flowchart showing the sequence of operations for effecting two modes of the optical marking system of FIG. 1;

FIG. 7 is a block diagram for illustrating the schematic construction of the optical marking system according to the first embodiment of this invention;

FIG. 11 is a block diagram of a control circuit for controlling the optical marking system of FIGS. 8 and 10; and FIG. 12 is a block diagram for illustrating the schematic construction of the optical marking system according to the second and third embodiments of this invention.

DETAILED DESCRIPTION OF THE PREFERRED EMBODIMENTS

Figure 1:
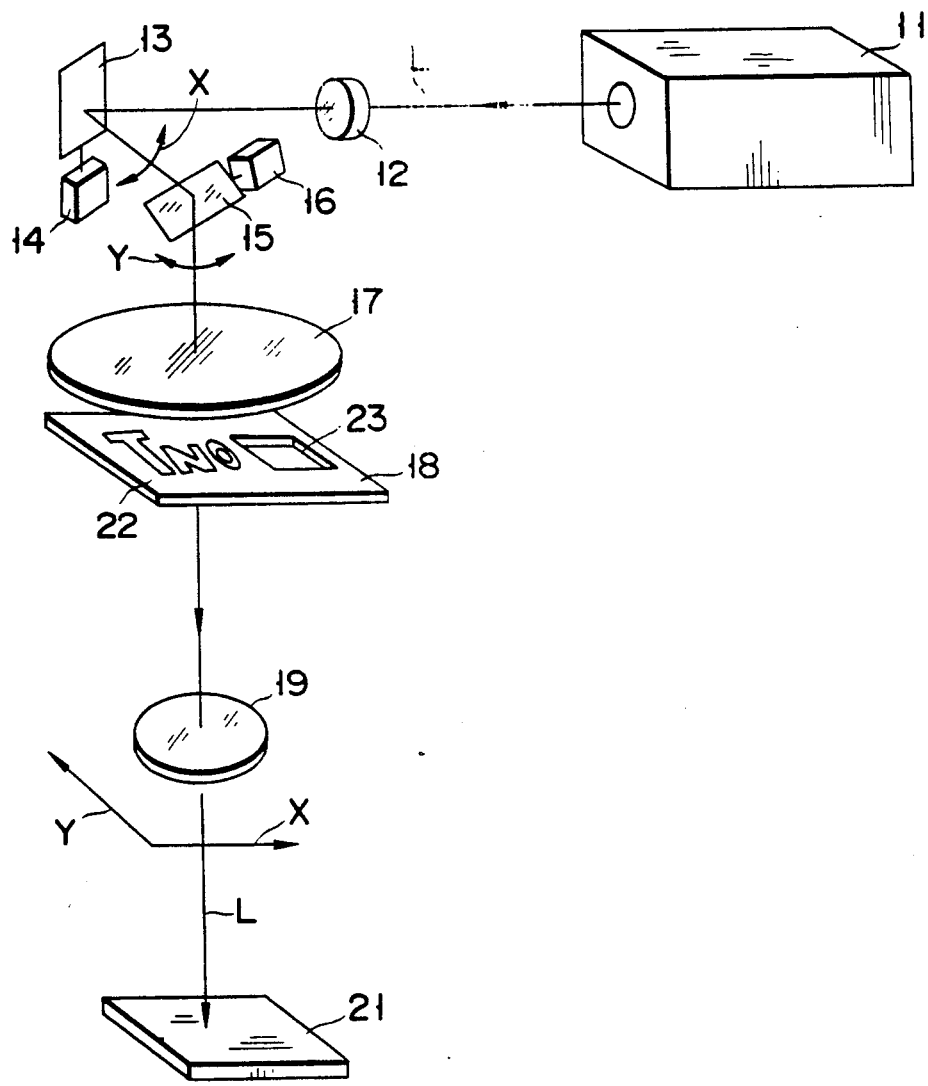
FIG. 1 is a diagram showing an optical marking system according to a first embodiment of this invention.

First, the schematic construction of an optical marking system according to a first embodiment of this invention is explained with reference to FIG. 7.

The optical marking system includes light source 11 for generating a light beam of a predetermined wavelength, optical system 60 for receiving the light beam generated by light source 11 and directing the received light beam in a preset direction, pattern generator 18 positioned in connection with optical system 60, and including a pattern forming section and a non-pattern forming section, and control section 50 connected to optical system 60, for controlling optical system 60 to effect a first mode in which the light beam is directed to the pattern forming section of pattern generator 18, to form a predetermined pattern, and a second mode, in which the light beam is directed to the non-pattern forming section of pattern generator 18, the first and second modes being effected in a preset sequence.

Further, the schematic construction of an optical marking system according to each of second and third embodiments of this invention is explained with reference to FIG. 12.

The optical marking system of this invention includes light source 121 for generating a light beam of a predetermined wavelength suitable for optically marking a work, first optical system 123 for receiving the light beam generated by light source 121 and directing the received light beam in a preset direction, pattern generator 29 positioned in connection with first optical system 123, and including a plurality of patterns of at least one kind and of different sizes, first control section 50a, connected to first optical system 123, for controlling first optical system 123 to select one of the plurality of patterns of pattern generator 29, second optical system 33, for receiving a light pattern corresponding to the pattern selected by means of first control section 50a and directing the light pattern to the work, and second control section 50b, connected to second optical system 33, for controlling second optical system 33 to mark the work according to the pattern selected by means of first control section 50a.

Now, the optical marking system according to the first embodiment of this invention is explained.

FIG. 1 is a diagram showing the optical marking system according to the first embodiment of this invention. The optical marking system includes laser oscillator 11 for generating a laser beam of a preset wavelength. Laser oscillator 11 uses a laser that generates a Q switching output of peak power. Laser beam L generated by laser oscillator 11 is passed through condenser lens 12 and directed to first mirror 13. First mirror 13 is driven to rotatively oscillate in a preset angle range by means of first galvanometer scanner 14. Laser beam L reflected by means of first mirror 13 is transmitted to second mirror 15. Second mirror 15 is driven to rotatively oscillate in a preset angle range by means of second galvanometer scanner 16. First and second galvanometer scanners 14 and 16 are arranged such that the rotation axes thereof are set perpendicular to each other. With this arrangement, incident laser beam L can be deflected in a direction of X axis by rotatively oscillating first mirror 13 by means of first galvanometer scanner 14, and at the same time, incident laser beam L can be deflected in a direction of Y axis by rotatively oscillating second mirror 15 by means of second galvanometer scanner 16.

Laser beam L reflected by means of second mirror 15 is applied to object 21 via relay lens 17, rectangular mask 18 and image-forming lens 19. As shown in FIG. 2, a complicated pattern (for example, "T NO4") such as a company emblem is formed on the left portion of mask 18 and rectangular opening 23 is formed in the right portion thereof.

Relay lens 17 is formed sufficiently large so as to direct laser beam L to image-forming lens 19 after laser beam L reflected by second mirror 15 has passed through pattern section 22 or opening 23 of mask 18. This will be clearly understood from the fact that it is necessary to place relay lens 17 of at least the same size as mask 18 in front of mask 18 as shown in FIG. 4 in order to apply laser beam L to the entire portion of mask 18. Laser beam L directed to image-forming lens 19 via mask 18 by means of relay lens 17 is converged by means of image-forming lens 19 and then applied to object 21.

Figure 5:
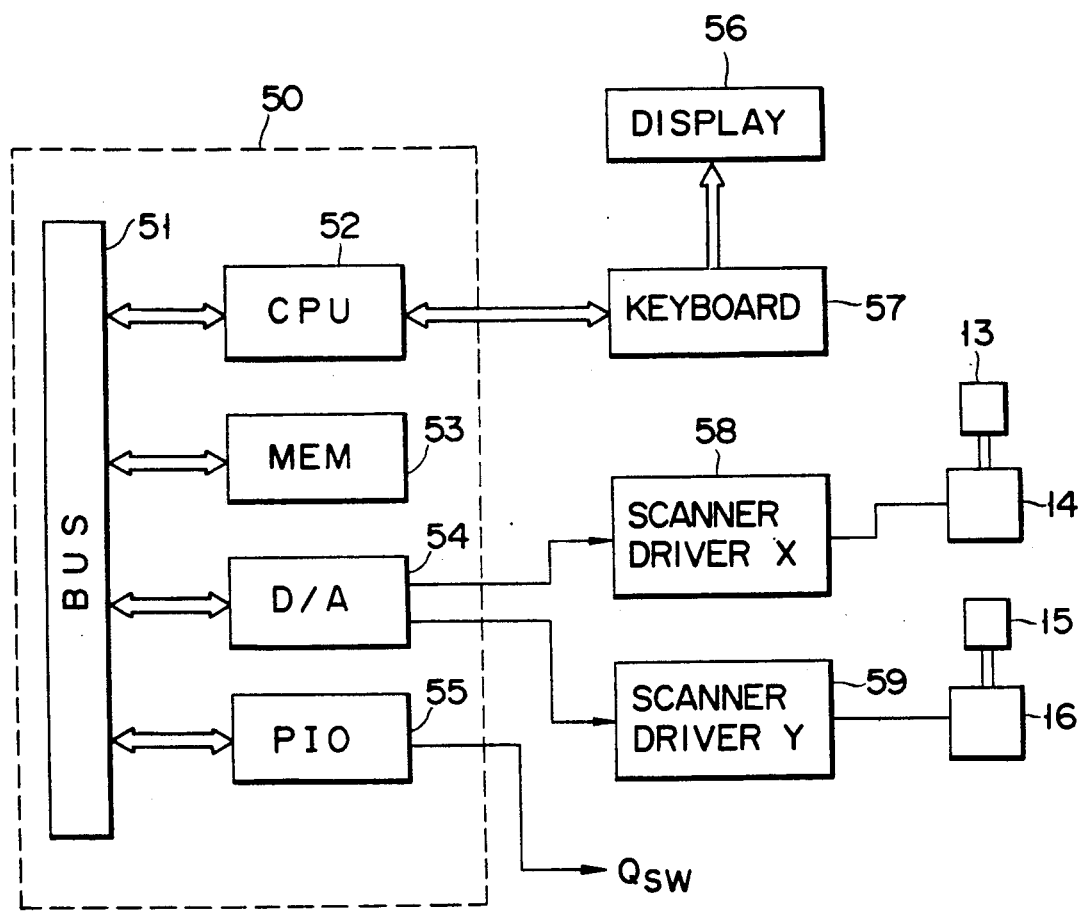
FIG. 5 is a block diagram of a control circuit for controlling the optical marking system of FIG. 1.

Now, the control circuit of the optical marking system according to the first embodiment of this invention is explained with reference to a block diagram of FIG. 5. The control circuit includes computer control section 50 which includes central processing unit (CPU) 52, memory (MEM) 53, digital-analog (D/A) converter 54, PIO 55 serving as an interface for the Q switching and bus 51 serving as a path for data transfer between the above circuits.

For example, one of the first mode (raster scan mode) and the second mode (character mode) described before is selected by reading out a preset program stored in memory 53. Then, CPU 52 supplies a preset digital signal corresponding to the selected mode to D/A converter 54 which in turn converts the input digital signal to an analog signal and supplies the analog signal to scanner drivers 58 and 59. Scanner drivers 58 and 59 respectively drive galvanometer scanners 14 and 16 so as to rotate first and second mirrors 13 and 15 by a preset angle. As a result, laser beam L generated by laser oscillator 11 is controlled so that laser beam L can be directed and applied to a desired portion of object 21. The adjustment of the marking position prior to the marking can be effected while observing the marking position displayed on display 56. Further, when the laser marking system becomes defective, the marking operation can be interrupted by supplying a preset signal from keyboard 57.

Now, the marking process for marking a combination of a complicated pattern made on the mask and a simple pattern which can be formed with a single stroke, for example, "T NO22" is explained with reference to the flowchart of FIG. 6. Mark "T NO" is an unchanged portion which is seldom changed for each marking process and the serial number "22" is frequently changed. As described before, in this invention, the raster-scan mode in which a pattern on the mask is formed and the character mode in which a pattern is formed with a single stroke are used.

First, in step 1, a work position is determined and the workpiece to be marked is set by a positioning apparatus, such as a handler. In step 2, data for the marking is input as codes into memory (MEM) 53. The codes represent characters to be formed or patterns such as trademarks, or the marking modes. For example, when the mark "T NO22" is intended to be formed on the workpiece, a code "R1" is used for forming "T NO" in the raster-scan mode, and two codes "C2C2" are used for forming the serial number "22" in the character mode. Therefore, the resulting codes for forming "T NO22" will be "R1C2C2". In step 3, it is judged whether the raster-scan mode or character mode in set. In this case, the raster-scan mode is selected and executed in step 4. When the raster-scan mode is effected, laser beam L generated by laser oscillator 11 is controlled by the rotation movement of first and second mirrors 13 and 15 so as to raster-scan the entire portion of pattern 22 (area a surrounded by chain lines) of mask 18. Laser beam L passes through only pattern 22 formed on mask 18 and is focused on object 21 by means of image-forming lens 19. In this way, mark ml of "T NO" is formed on object 21. After this, it is judged in step 6 whether the marking process is completed or not. In this case, "NO" is selected and step 3 is repeated. In step 3, the character mode is selected this time and is executed in step 5.

When the character mode is effected, laser beam L generated by laser oscillator 11 is controlled by the rotation movement of first and second mirrors 13 and 15 so as to pass through opening 23 of mask 18 and draw the number "2" on object 21. To complete the marking of "22", the character mode is repeated. In step 7, it is judged whether another workpiece is positioned. When it is detected that another workpiece is positioned, step 1 is executed again to repeatedly effect the same operation. When it is detected that no workpiece is positioned, the marking operation is interrupted.

In this way, a combination of mark ml of "T NO" and mark m2 of serial number "22" can be formed on the workpiece, as shown in FIG. 3.

As described above, in this invention, the marking operations for a complicated pattern which is seldom changed and a pattern which is frequently changed are separately effected in two different modes. Therefore, the operation of an optical marking system can be simplified.

Further, in the embodiment of this invention, the galvanometer scanner is used as a device for rotating the mirror, but the device is not limited thereto and may be constituted by a motor, for example. Also, it is possible to use a polygon mirror as the mirror. The opening is formed in the mask in the above embodiment, but a light transmission body may be formed instead of forming the opening. Further, it is also possible to use a mask having only the unchanged portion without forming the opening.

Figure 8:
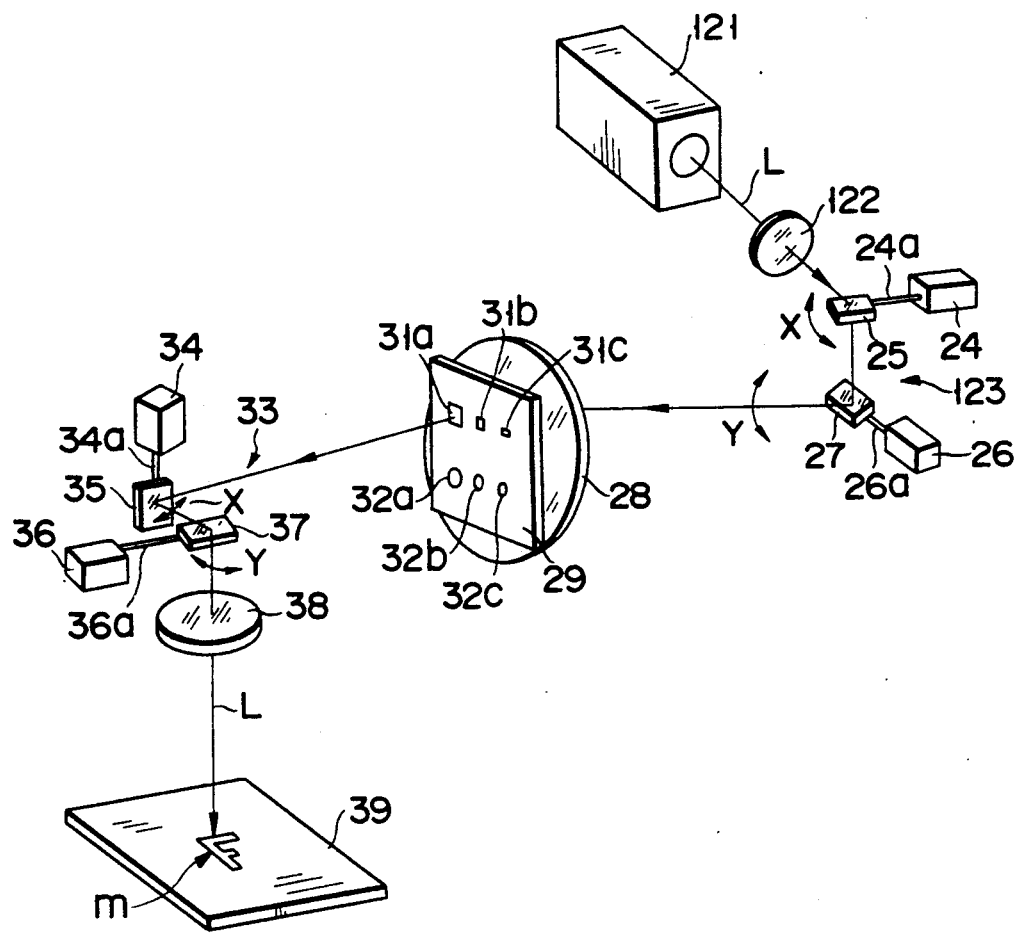
FIG. 8 is a diagram showing an optical marking system according to a second embodiment of this invention.

Now, an optical marking system according to the second embodiment of this invention is explained with reference to FIG. 8. The optical marking system shown in FIG. 8 includes laser oscillator 121. Laser oscillator 121 generates laser beam L having a circular cross section which passes first lens 122 and enters optical system 123 for freely setting the travelling direction of laser beam L. Optical system 123 includes first mirror 25 which is rotatively oscillated by means of first galvanometer scanner 24 and second mirror 27 which is rotatively oscillated by means of second galvanometer scanner 26. First and second galvanometer scanners 24 and 26 are arranged such that the rotation axes 24a and 26a thereof are set perpendicular to each other. With this arrangement, incident laser beam L can be deflected in an X direction by means of first mirror 25, and incident laser beam L can be deflected in a Y direction by means of second mirror 27. That is, laser beam L can be deflected in the X and Y directions by means of optical system 123.

Laser beam L from second mirror 27 of optical system 123 passes relay lens 28 and enters pattern mask 29. Pattern mask 29 has a plurality of rectangular light transmission patterns 31a, 31b, ... with different sizes and a plurality of circular light transmission patterns 32a, 32b, ... with different sizes formed as the transmission pattern through which laser beam L passes. With this arrangement, laser beam L can pass a selected one of the light transmission patterns by changing the travelling direction of laser beam L by means of optical system 123.

Laser beam L which has passed the selected light transmission pattern of pattern mask 29 enters scanning system 33. Scanning system 33 includes third mirror 35 which is rotatively oscillated by means of third galvanometer scanner 34 and fourth mirror 37 which is rotatively oscillated by means of fourth galvanometer scanner 36. First and second galvanometer scanners 34 and 36 are arranged such that the rotation axes 34a and 36a thereof are set perpendicular to each other. Further, third mirror 35 is disposed in position so that laser beam L having passed the selected light transmission pattern can enter third mirror 35. Therefore, laser beam L incident on third mirror 35 may be deflected in the X direction and laser beam L incident on fourth mirror 37 may be deflected in the Y direction.

Laser beam L from fourth mirror 37 of scanning system 33 is converged by means of second lens 38 and focused on work 39. That is, laser beam L applied to work 39 and having a cross section corresponding to a selected light transmission pattern of pattern mask 39 is scanned in the X and Y directions on work 39 by means of scanning system 33.

Figure 9:
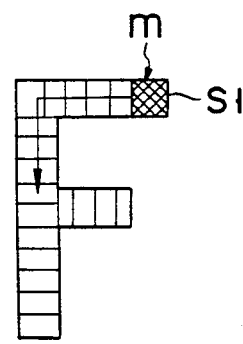
FIG. 9 shows a case where mark "F" is made.

Now, assume a case where mark "F" shown in FIG. 9 is made by use of marking system of the above construction. In this case, the angles of first and second mirrors 25 and 27 in the X and Y directions are respectively set by means of first and second galvanometer scanners 24 and 26 so that laser beam L generated by laser oscillator 121 can pass rectangular light transmission pattern 31a having a dimension corresponding to the line width of mark "F".

After the angles of first and second mirrors 25 and 27 in the X and Y directions are set in this way, laser beam L is generated by laser oscillator 121 and at the same time laser beam L which has passed relay lens 28 and first light transmission pattern 31a is scanned by means of controlling the rotation movement of third and fourth mirrors 35 and 37 to draw mark "F" on work 39. Thus, mark "F" as shown in FIG. 9 can be formed on work 39.

According to the above marking process, when laser beam L has passed first rectangular light transmission pattern 31a of pattern mask 29, laser spot S1 having a rectangular cross section corresponding to first rectangular light transmission pattern 31a is emitted from first rectangular light transmission pattern 31a. As a result, mark "F" can be formed on work 39 without rounding the edge portion thereof. Further, laser beam L is directed to pass first rectangular light transmission pattern 31a which is one of a plurality of rectangular light transmission patterns 31a, 31b, 31c, ... and has a dimension corresponding to the line width of mark "F". Therefore, the entire portion of the line width of mark "F" can be made by directly using rectangular spot S1 emitted from first rectangular light transmission pattern 31a. In other words, it is not necessary to repeatedly scan spot S1 in order to mark the entire portion of the line width dark, and therefore the operational efficiency of the optical marking system can be improved.

In a case of the laser marking in which it is not necessary to make a sharp edge, that is, the laser marking for making a mark including a round edge portion, that one of circular light transmission patterns 32a, 32b, 32c, ... whose dimension corresponds to the line width of the mark is selected and then laser beam L is controlled by means of scanning system 33 to pass the selected circular light transmission pattern and is scanned.

Figure 10:
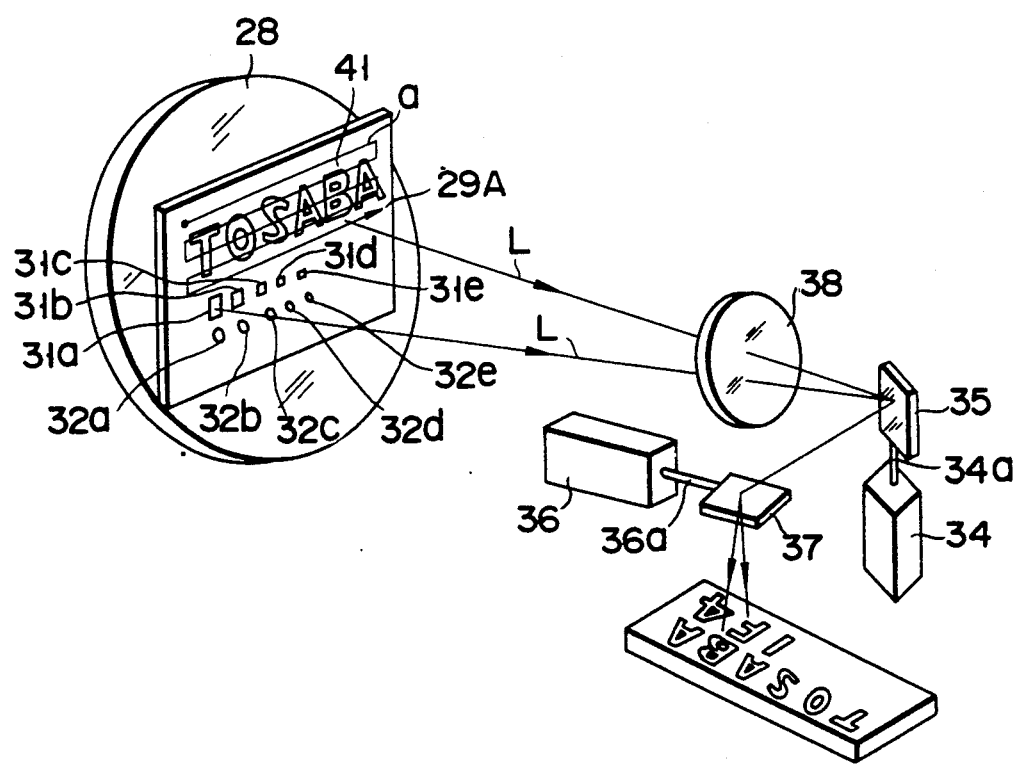
FIG. 10 is a diagram showing an optical marking system according to a third embodiment of this invention.

FIG. 10 shows an optical marking system according to a third embodiment of this invention. In this embodiment, third light transmission pattern 41 such as a company emblem or a mold number which is frequently used is formed on pattern mask 29A in addition to first rectangular light transmission patterns 31a, 31b, 31c, . . . and second circular light transmission patterns 32a, 32b, 32c, . . . Further, in this embodiment, second lens 28 is disposed on the incident side of third mirror 35 but can be disposed on the emission side of fourth mirror 37 in the same manner as in the second embodiment.

With pattern mask 29A of the above construction, the mark such as the company emblem which is frequently used can be efficiently and stably made by scanning laser beam L on the entire portion of third light transmission pattern 41 as shown by arrow a.

Further, in a case where a mark of a desired shape is made, one of first light transmission patterns having a desired dimension is selected in the same manner as in the second embodiment and then laser beam L is passed through the selected first light transmission pattern and is scanned in a single stroke by means of third and fourth mirrors 35 and 37 so as to make a mark having sharp edge portions.

In each of the above embodiments, a rectangular pattern is used as the first polygonal light transmission pattern, but another polygonal pattern such as a pentagonal or hexagonal pattern may be used depending on the shape of a mark to be made.

Further, in the second and third embodiments, a control circuit shown in FIG. 11 is used. As is clearly shown from FIG. 11, the control circuit is similar to that of the first embodiment except that two additional optical systems are used in the second and third embodiments.

As described above, according to this invention, a plurality of polygonal patterns of different sizes are formed in the pattern mask. Therefore, after the laser beam has passed the light transmission pattern, the laser beam will have a cross section of a corresponding polygonal shape. As a result, the edge portion can be marked sharply. A desired mark can be made with one scanning operation by selecting a light transmission pattern of a dimension corresponding to the line width of the mark, thus enhancing the operational efficiency of optical marking system.

What is claimed is:

1. A laser marking apparatus for marking a material by selectively removing a surface layer from the material, comprising:
    a light source for generating a laser beam of a preset wavelength;
    optical means including a relay lens for receiving the laser beam generated by said light source and directing the received laser beam in a preset direction, said optical means including an optical element;
    forming means, disposed apart from the material, for forming a pattern, said optical element being positioned between said forming means and said material and converging said directed laser beam onto said material, and said forming means including a pattern forming section and a non-pattern forming section; and
    control means connected to said optical means, for controlling said optical means to effect a first mode, in which the received laser beam is directed to said pattern forming section of said forming means, to form a predetermined pattern, and a second mode, in which the received laser beam is directed to said non-pattern forming section of said forming means, said first and second modes being effected in a preset sequence.

2. A laser marking apparatus according to claim 1, wherein said optical means includes a pair of mirrors for directing the laser beam and means for driving said pair of mirrors.

3. A laser marking apparatus according to claim 1, wherein said relay lens comprises:
    an optical member disposed between said light source and said forming means and having a size at least as large as said forming means, said optical member being capable of directing said received laser beam over an entire area of said forming means.

4. A laser marking apparatus according to claim 1, wherein said control means controls said optical means to direct said received laser beam to said pattern forming section of said forming means to form a first portion of said pattern on said material in said first mode, and controls said optical means to direct said received laser beam through said non-pattern forming section of said forming means and onto said material to form a second portion of said pattern.

5. A laser marking apparatus according to claim 1, further comprising an image forming lens for forming an image of the predetermined pattern formed by means of said pattern forming section.

6. A laser marking apparatus according to claim 1, wherein the predetermined pattern of said forming means is formed by etching.

7. A laser marking apparatus according to claim 1, wherein said non-pattern forming section of said forming means is an opening.

8. A laser marking apparatus for marking material by selectively removing a surface layer from the material, comprising:
    a light source for generating a laser beam of a preset wavelength;
    first optical means including a relay lens, for receiving the laser beam generated by said light source and directing the received laser beam in a preset direction;
    forming means positioned in connection with said first optical means and disposed apart from the material, and including a plurality of patterns of at least one kind and of different sizes;
    first control means, connected to said first optical means, for controlling said first optical means to select one of the patterns of said forming means;
    second optical means including a lens, for receiving a laser beam pattern corresponding to the pattern selected by means of said first control means and transmitting the received laser beam pattern to said material; and
    second control means, connected to said second optical means, for controlling said second optical means to mark the material according to the pattern selected by means of said first control means.

9. A laser marking apparatus according to claim 8, wherein said first optical means includes a pair of mirrors for directing the laser beam and means for driving said pair of mirrors.

10. A laser marking apparatus according to claim 8, wherein said second control means controls said second optical means to mark said material in a desired pattern formed by directing said laser beam corresponding to said selected pattern onto said material in a predetermined arrangement.

11. A laser marking apparatus according to claim 8, wherein said second optical means includes a pair of mirrors for receiving the laser beam pattern corresponding to the selected pattern and means for driving said pair of mirrors.

12. A laser marking apparatus according to claim 8, wherein said relay lens comprises:

an optical member disposed between said light source and said forming means and having a size at least as large as said forming means, said optical member being capable of directing said received laser beam over an entire area of said forming means.

13. A laser marking apparatus according to claim 8, wherein said plurality of patterns of at least one kind include circular, rectangular, pentagonal, and hexagonal patterns.

14. A laser marking apparatus according to claim 8, wherein said forming means includes at least one fixed size pattern.

15. A laser marking apparatus according to claim 8, wherein said first control means controls said first optical means to effect a first mode, in which the fixed size pattern is formed, and a second mode, in which said plurality of patterns of at least one kind is formed, said first and second modes being effected in a preset sequence.

16. A laser marking method for making a material by selectively removing a surface layer from the material, comprising the steps of:

generating a laser beam of a preset wavelength;

controlling an optical system to generate a preset pattern by directing the laser beam to a pattern generator, in a first mode; and controlling said optical system in a second mode to directly apply the laser beam to an object.

17. A laser marking method comprising the steps of:

generating a laser beam of a preset wavelength;

controlling a first optical system to direct the laser beam to one of a plurality of patterns of at least one kind on a pattern generator, so as to generate a corresponding laser pattern; and controlling a second optical system to direct the corresponding laser pattern to an object.

18. A laser marking method according to claim 17, further comprising a step of directing the laser beam to at least one fixed size pattern on the pattern generator, so as to generate a corresponding laser pattern.

* * * * *